(12) United States Patent
Aiouaz et al.

(10) Patent No.: US 8,427,315 B2
(45) Date of Patent: Apr. 23, 2013

(54) AHEAD-OF-TIME SCHEDULING OF COMMANDS IN RFID READER SYSTEMS

(75) Inventors: Ali Aiouaz, Mission Viejo, CA (US);
David Ord, Aliso Viejo, CA (US);
Omar Khwaja, Irvine, CA (US)

(73) Assignee: Impinj, Inc., Seattle, WA (US)

( * ) Notice: Subject to any disclaimer, the term of this patent is extended or adjusted under 35 U.S.C. 154(b) by 1600 days.

(21) Appl. No.: 11/509,290

(22) Filed: Aug. 23, 2006

(65) Prior Publication Data

US 2007/0236335 A1    Oct. 11, 2007

Related U.S. Application Data

(60) Provisional application No. 60/786,875, filed on Mar. 29, 2006.

(51) Int. Cl.
*H04Q 9/02* (2006.01)
*G08B 29/00* (2006.01)

(52) U.S. Cl.
USPC ..................... 340/572.1; 340/10.1

(58) Field of Classification Search .............. 340/10.1
See application file for complete search history.

(56) References Cited

U.S. PATENT DOCUMENTS

| | | | |
|---|---|---|---|
| 5,880,671 A * | 3/1999 | Ranson et al. | 340/146.2 |
| 6,118,789 A * | 9/2000 | Wood, Jr. | 370/462 |
| 6,946,950 B1 * | 9/2005 | Ueno et al. | 340/10.1 |
| 6,985,721 B1 * | 1/2006 | Khorram | 455/414.1 |
| 7,295,114 B1 * | 11/2007 | Drzaic et al. | 340/572.1 |
| 2001/0040513 A1 * | 11/2001 | McDonald | 340/825.49 |
| 2002/0005774 A1 * | 1/2002 | Rudolph et al. | 340/5.61 |
| 2002/0118099 A1 * | 8/2002 | Oda et al. | 340/10.52 |
| 2002/0167397 A1 * | 11/2002 | Eroglu et al. | 340/10.6 |
| 2003/0220101 A1 * | 11/2003 | Castrogiovanni et al. | 455/419 |
| 2004/0090310 A1 * | 5/2004 | Hohberger et al. | 340/10.1 |
| 2006/0153579 A1 * | 7/2006 | Phipps et al. | 399/24 |
| 2007/0164851 A1 * | 7/2007 | Cooper | 340/10.2 |

* cited by examiner

*Primary Examiner* — Brian Zimmerman
*Assistant Examiner* — Cal Eustaquio
(74) *Attorney, Agent, or Firm* — Turk IP Law, LLC

(57) ABSTRACT

RFID reader systems, software and methods precompute one or more reader commands, before a tag actually responds to an earlier transmitted command. This way a system can result at a high data rate, while meeting specification requirements of responding within a preset time.

24 Claims, 12 Drawing Sheets

100

RFID SYSTEM

*RFID SYSTEM*

*RFID TAG*

RFID TAG COMPONENTS

SIGNAL PATH DURING R→T

SIGNAL PATH DURING T→R

*RFID TAG STATE MACHINE COMPLIANT WITH GEN2 SPEC*

*AOTS USED TO MEET AIR INTERFACE REQUIREMENTS*

*AOTS USED TO MEET AIR INTERFACE REQUIREMENTS*

AHEAD-OF-TIME SCHEDULING OF COMMANDS IN RFID READER SYSTEMS

RELATED APPLICATIONS

This utility patent application claims priority from U.S.A. Provisional Patent Application No. 60/786,875, filed 2006-Mar.-29, the disclosure of which is hereby incorporated by reference for all purposes.

TECHNICAL FIELD

The present description is related to the field of Radio Frequency IDentification (RFID), and more specifically to devices, systems, software and methods for RFID readers.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

RFID readers and tags typically communicate with each other in accordance with an air-interface protocol. An air-interface protocol may be described as a precise and detailed written description and set of rules defining the way in which a reader and tags operate while communicating via radio waves. An air-interface protocol may define the types of commands and responses that may be communicated, as well as the timing requirements for such communications.

Meeting the timing requirements sometimes is a challenge. For example, when a reader receives a response from a tag, it may have a short time to respond. This is a problem particularly in environments that have high data rates. The reader may have a challenge if it tries to do further operations, such as error checking, and respond also as it is determined from the error checking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present description gives instances of RFID reader systems, software and methods, the use of which may help overcome these problems and limitations of the prior art. Briefly, a next reader command starts being planned before it is needed.

In some embodiments, a first reader command is transmitted. Before a first tag response is actually received, interim processing can begin for generating a second command. When a first tag response is actually received, this second reader command can be transmitted responsive to the received first tag response.

An advantage of the invention is that the second reader command is generated and sent more quickly, because its generation began before the actual first tag response is received. And this can be critical for responding within the time allotted by the protocol, if processing is to be performed additional to the received actual first tag response.

Another advantage over the prior art is that the time saved can be relatively so large that additional processing can be performed. When this additional processing is error checking, it increases the performance of the RFID reader system, even in the face of interference.

This and other features and advantages of the invention will be better understood in view of the Detailed Description and the Drawings, in which:

DETAILED DESCRIPTION

As has been mentioned, the present description is about RFID reader systems, software and methods for RFID readers to start computing their next command before even receiving a response from a tag. Such implementations are sometimes referred to as Ahead-Of-Time Scheduling (AOTS). The subject is now described in more detail.

Figure 1:
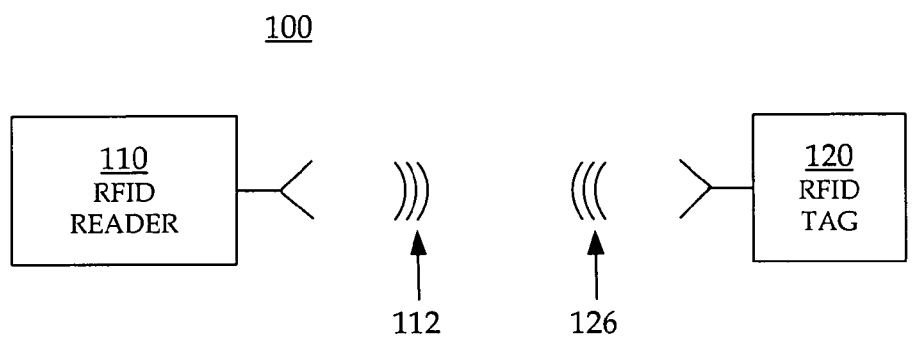
FIG. 1 is a block diagram of components of an RFID system.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
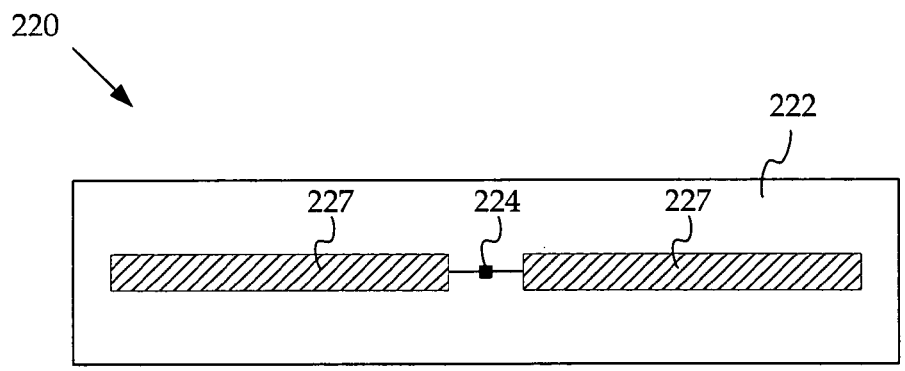
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and responds if appropriate, based on the incoming signal and its internal state. In order to respond by replying, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
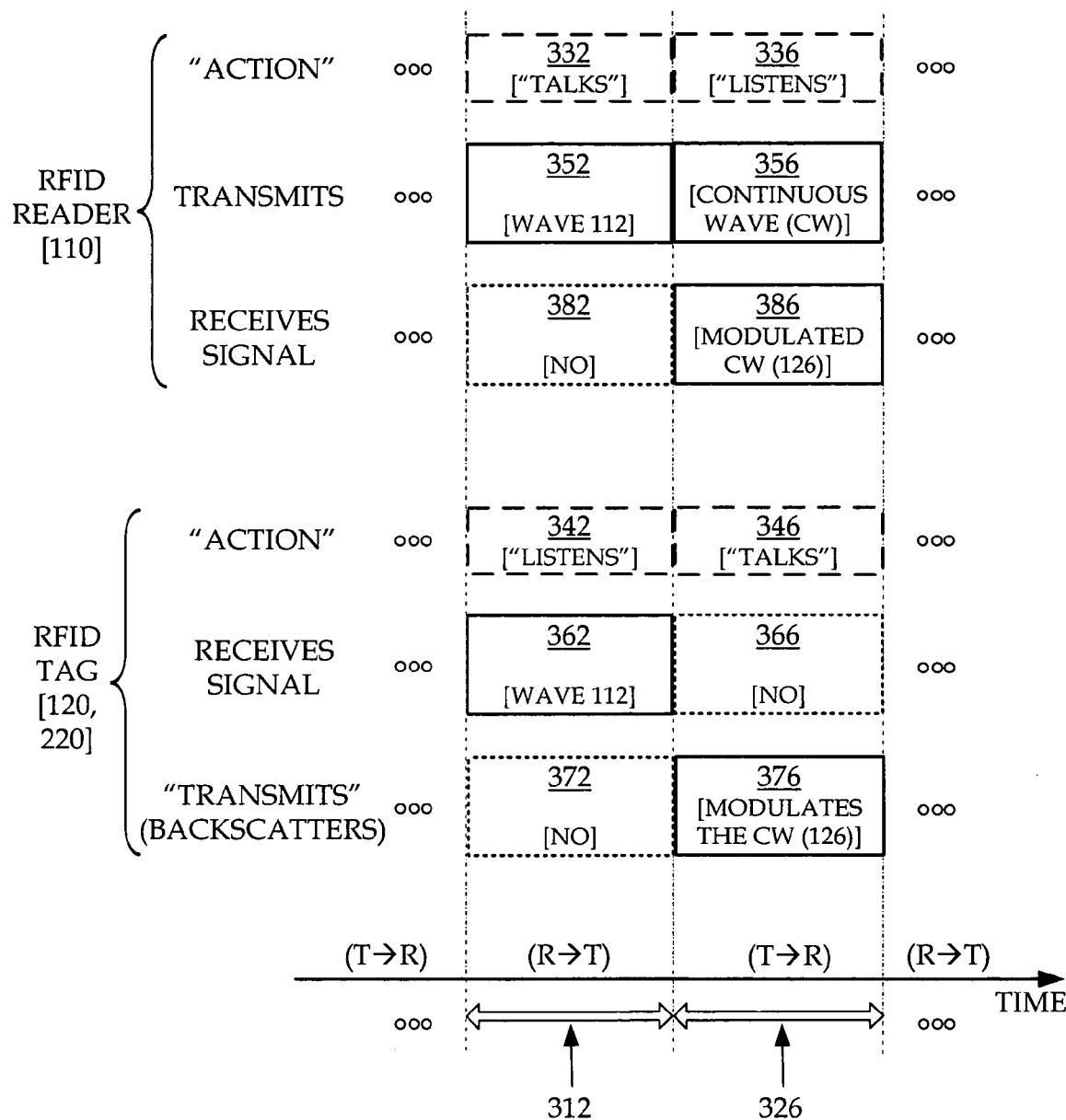
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

As discussed above in the Background section, one such protocol is called the Specification for RFID Air-interface— EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitter CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
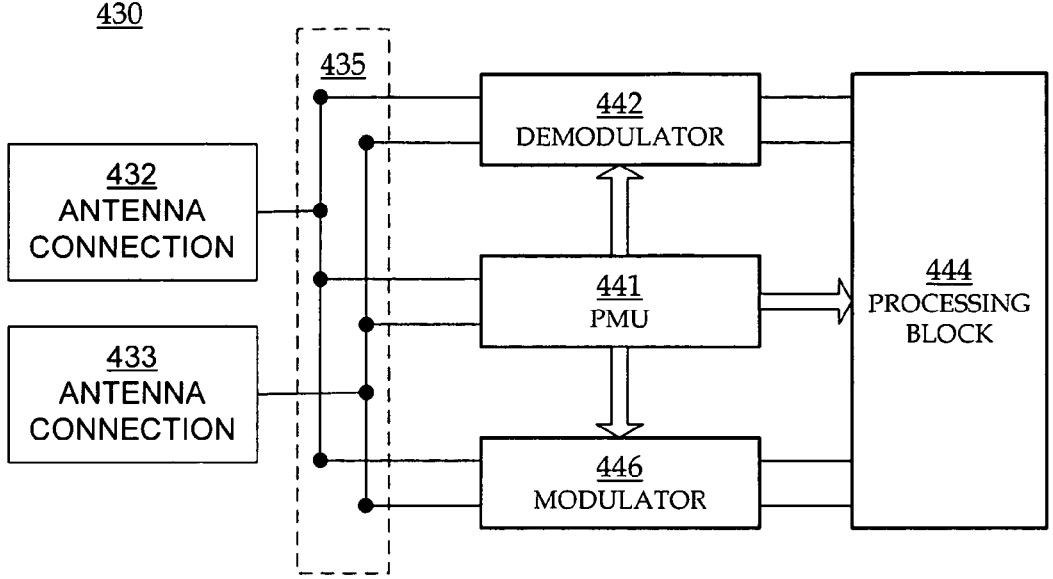
FIG. 4 is a block diagram of an implementation of an electrical circuit formed in an IC of the tag of FIG. 2.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more than two antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session, in treating a signal. The different operations are described below.

Figure 5A:
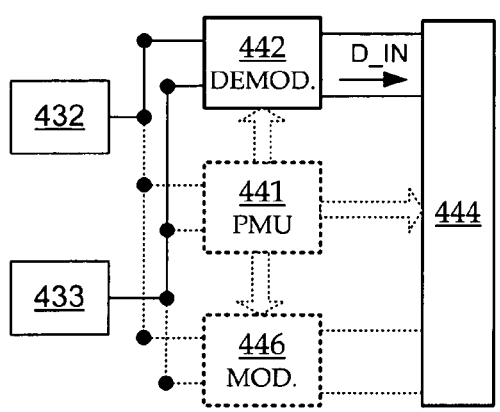
FIG. 5A is the block diagram of FIG. 4, modified to emphasize a signal operation during a R→T session of FIG. 3.

FIG. 5A shows version 530-A of circuit 430 of FIG. 4. Version 530-A shows the components of circuit 430 for a tag, further modified to emphasize a signal operation during a R→T session (receive mode of operation) during time interval 312 of FIG. 3. An RF wave is received from antenna connections 432, 433, a signal is demodulated from demodulator 442, and then input to processing block 444 as D_IN. In one embodiment according to the present invention, D_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
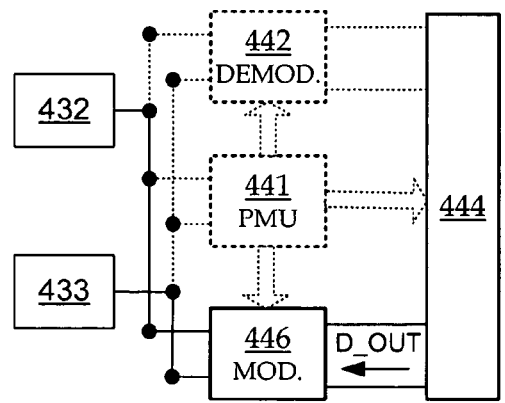
FIG. 5B is the block diagram of FIG. 4, modified to emphasize a signal operation during a T→R session of FIG. 3.

FIG. 5B shows version 530-B of circuit 430 of FIG. 4. Version 530-B shows the components of circuit 430 for a tag, further modified to emphasize a signal operation during a T→R session during time interval 326 of FIG. 3. A signal is output from processing block 444 as D_OUT. In one embodiment according to the present invention, D_OUT may include a transmission stream of symbols. D_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
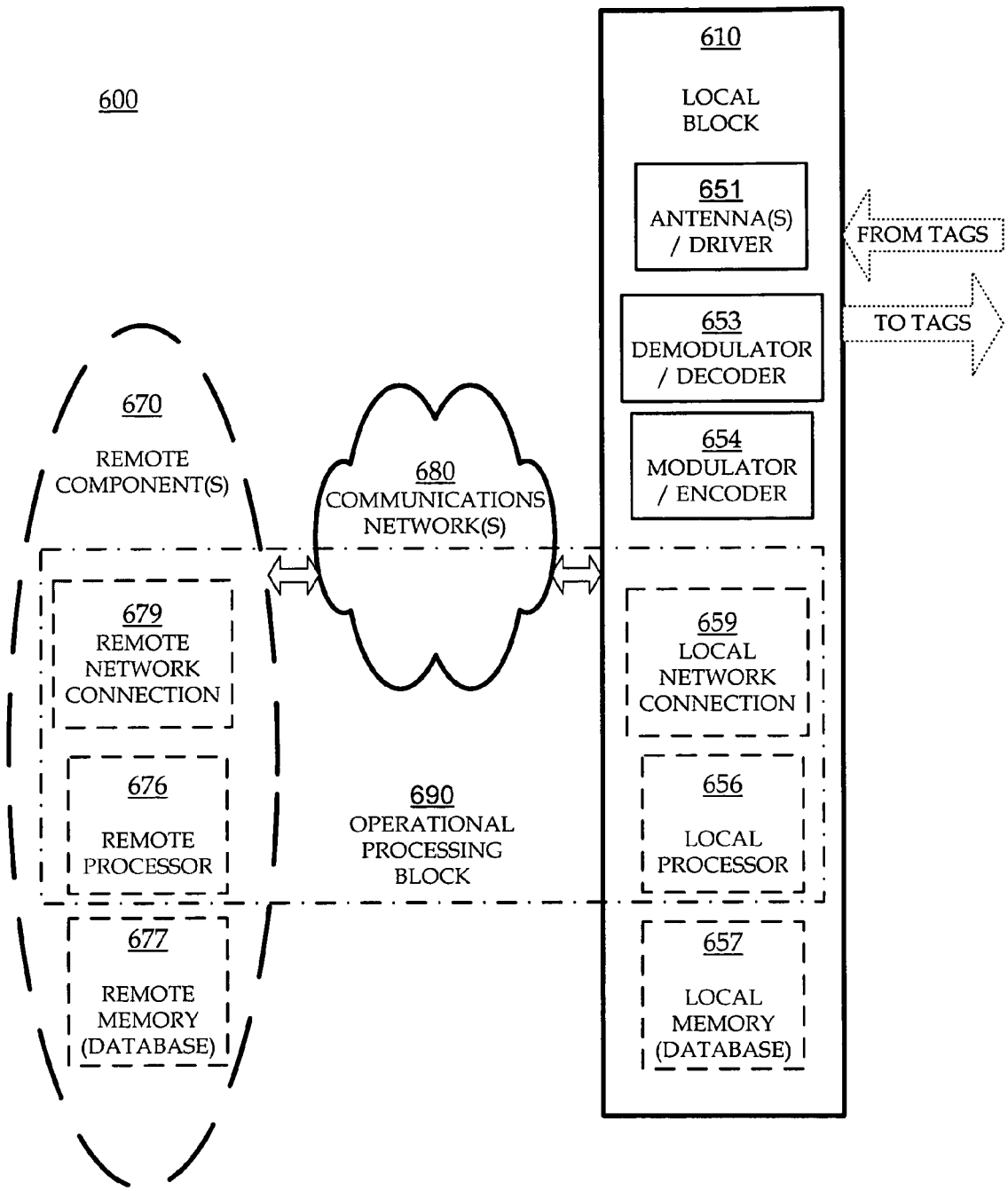
FIG. 6 is a block diagram of a whole RFID reader system according to embodiments.

FIG. 6 is a block diagram of a whole RFID reader system 600 according to embodiments. System 600 includes a local block 610, and optionally remote components 670. Local block 610 and remote components 670 can be implemented in any number of ways. It will be recognized that reader 110 of FIG. 1 is the same as local block 610, if remote components 670 are not provided. Alternately, reader 110 can be implemented instead by system 600, of which only the local block 610 is shown in FIG. 1.

Local block 610 is responsible for communicating with the tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 653 demodulates and decodes backscattered waves received from the tags via antenna block 651. Modulator/encoder block 654 encodes and modulates an RF wave that is to be transmitted to the tags via antenna block 651.

Local block 610 additionally includes an optional local processor 656. Processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 653, the encoding function in block 654, or both, may be performed instead by processor 656.

Local block 610 additionally includes an optional local memory 657. Memory 657 may be implemented in any number of ways known in the art. Such ways include, by way of examples and not of limitation, nonvolatile memories (NVM), read-only memories (ROM), random access memories (RAM), any combination of one or more of these, and so on. Memory 657, if provided, can include programs for processor 656 to run, if provided.

In some embodiments, memory 657 stores data read from tags, or data to be written to tags, such as Electronic Product Codes (EPCs), Tag Identifiers (TIDs) and other data. Memory 657 can also include reference data that is to be compared to the EPC codes, instructions and/or rules for how to encode commands for the tags, modes for controlling antenna 651, and so on. In some of these embodiments, local memory 657 is provided as a database.

Some components of local block 610 typically treat the data as analog, such as the antenna/driver block 651. Other components such as memory 657 typically treat the data as digital. At some point there is a conversion between analog and digital. Based on where this conversion occurs, a whole reader may be characterized as "analog" or "digital", but most readers contain a mix of analog and digital functionality.

If remote components 670 are indeed provided, they are coupled to local block 610 via an electronic communications network 680. Network 680 can be a Local Area Network (LAN), a Metropolitan Area Network (MAN), a Wide Area Network (WAN), a network of networks such as the internet, and so on. In turn, local block 610 then includes a local network connection 659 for communicating with network 680.

There can be one or more remote component(s) 670. If more than one, they can be located at the same place with each other, or in different places. They can access each other and local block 610 via network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Processor 676 can be made in any way known in the art, such as was described with reference to local processor 656.

Remote component(s) 670 can also include a remote memory 677. Memory 677 can be made in any way known in the art, such as was described with reference to local memory 657. Memory 677 may include a local database, and a different database of a Standards Organization, such as one that can reference EPCs.

Of the above-described elements, it is advantageous to consider a combination of these components, designated as operational processing block 690. Block 690 includes those that are provided of the following: local processor 656, remote processor 676, local network connection 659, remote network connection 679, and by extension an applicable portion of network 680 that links connection 659 with connection 679. The portion can be dynamically changeable, etc. In addition, block 690 can receive and decode RF waves received via antenna 651, and cause antenna 651 to transmit RF waves according to what it has processed.

Block 690 includes either local processor 656, or remote processor 676, or both. If both are provided, remote processor 676 can be made such that it operates in a way complementary with that of local processor 656. In fact, the two can cooperate. It will be appreciated that block 690, as defined this way, is in communication with both local memory 657 and remote memory 677, if both are present.

Accordingly, block 690 is location agnostic, in that its functions can be implemented either by local processor 656, or by remote processor 676, or by a combination of both. Some of these functions are preferably implemented by local processor 656, and some by remote processor 676. Block 690 accesses local memory 657, or remote memory 677, or both for storing and/or retrieving data.

Reader system 600 operates by block 690 generating communications for RFID tags. These communications are ultimately transmitted by antenna block 651, with modulator/encoder block 654 encoding and modulating the information on an RF wave. Then data is received from the tags via antenna block 651, demodulated and decoded by demodulator/decoder block 653, and processed by processing block 690.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art.

A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination. An example of such a subdivision is now described.

Figure 7:
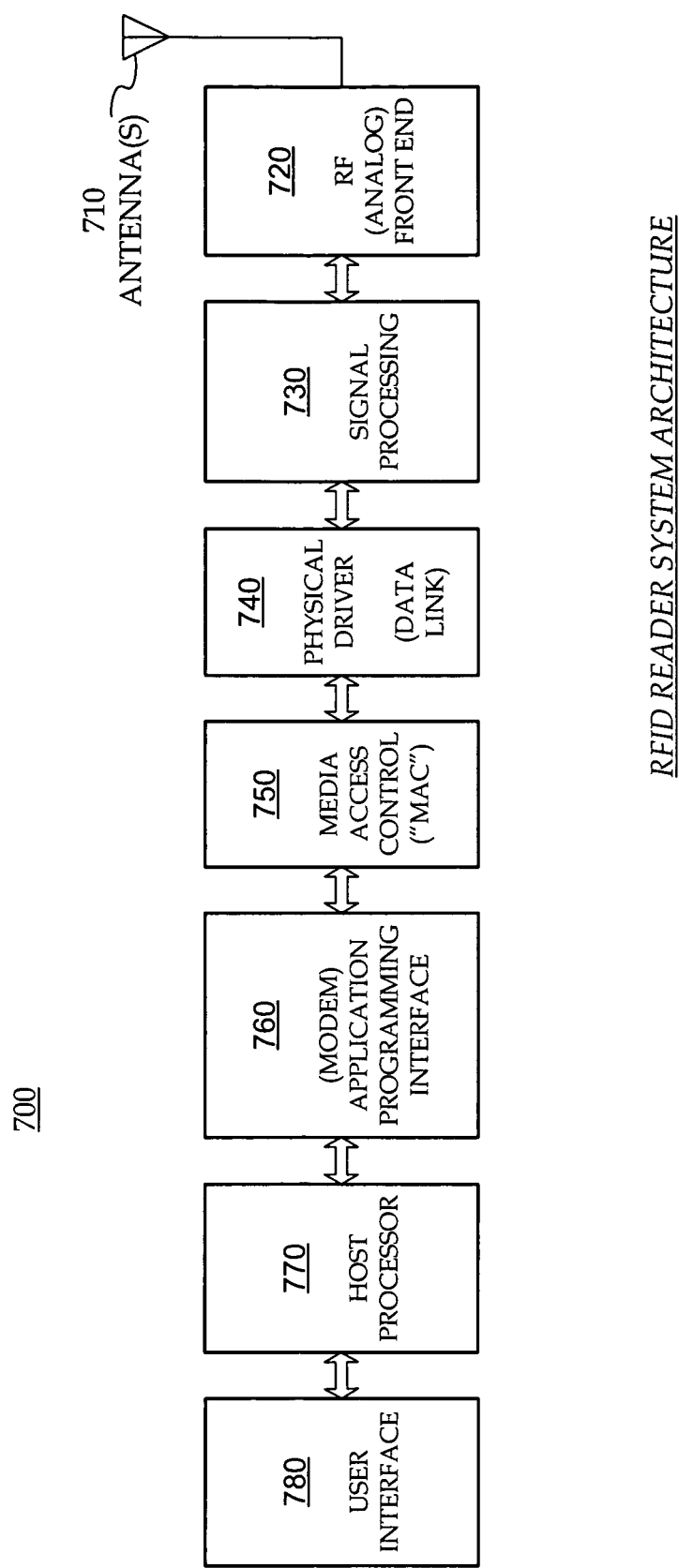
FIG. 7 is a block diagram illustrating an overall architecture of a RFID reader system according to embodiments.

FIG. 7 is a block diagram illustrating an overall architecture of a RFID reader system 700 according to embodiments. It will be appreciated that system 700 is considered subdivided into modules or components. Each of these modules may be implemented by itself, or in combination with others. It will be recognized that some aspects are parallel with those of FIG. 6. In addition, some of them may be present more than once.

RFID reader system 700 includes one or more antennas 710, and an RF Front End 720, for interfacing with antenna(s) 710. These can be made as described above. In addition, Front End 720 typically includes analog components.

System 700 also includes a Signal Processing module 730. In this embodiment, module 730 exchanges waveforms with Front End 720, such as I and Q waveform pairs. In some embodiments, signal processing module 730 is implemented by itself in an FPGA.

System 700 also includes a Physical Driver module 740, which is also known as Data Link. In this embodiment, module 740 exchanges bits with module 730. Data Link 740 can be the stage associated with framing of data. In one embodiment, module 740 is implemented by a Digital Signal Processor.

System 700 additionally includes a Media Access Control module 750, which is also known as MAC layer. In this embodiment, module 750 exchanges packets of bits with module 740. MAC layer 750 can be the stage for making decisions for sharing the medium of wireless communication, which in this case is the air-interface. Sharing can be between reader system 700 and tags, or between system 700 with another reader, or between tags, or a combination. In one embodiment, module 750 is implemented by a Digital Signal Processor.

System 700 moreover includes an Application Programming Interface module 760, which is also known as API, Modem API, and MAPI. In some embodiments, module 760 is itself an interface for a user.

System 700 further includes a host processor 770. Processor 770 exchanges signals with MAC layer 750 via module 760. In some embodiments, host processor 770 is not considered as a separate module, but one that includes some of the above-mentioned modules of system 700. A user interface 780 is coupled to processor 770, and it can be manual, automatic, or both.

Host processor 770 can include applications for system 700. In some embodiments, elements of module 760 may be distributed between processor 770 and MAC layer 750.

It will be observed that the modules of system 700 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 710 as signals, which are in turn processed successively by the various modules in the chain. Processing can terminate in any one of the modules. In a transmitting mode, initiation can be in any one of these modules. That, which is to be transmitted becomes ultimately signals for antenna(s) 710 to transmit as wireless waves.

The architecture of system 700 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software. This is regardless of how each element is implemented.

The challenges of the prior art are now described. Description is by using as an example the above mentioned Gen2 Spec, which is also known as the Gen2 protocol.

This document defines physical and logical requirements for a passive-backscatter, interrogator-talks-first (ITF), RFID system operating in the 860 MHz-960 MHz frequency range. The Gen2 Spec defines an industry standard designed to promote interoperability between RFID readers and tags manufactured by different vendors. It should be kept in mind, however, that the present invention is by no means limited to systems designed to operate in accordance with the Gen2 air-interface protocol, nor to any other specific protocol.

Figure 8:
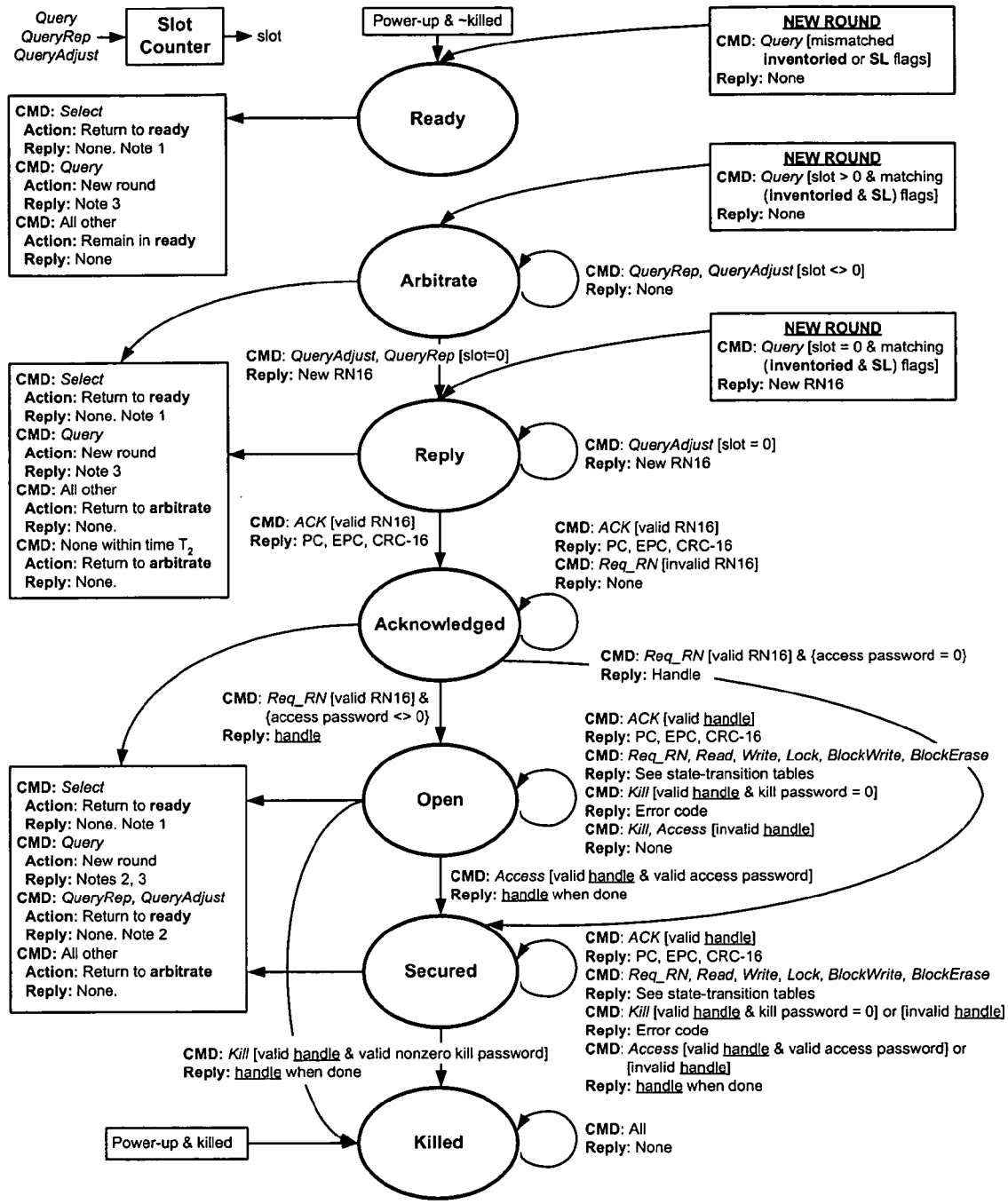
FIG. 8 is a state machine diagram according to a specific sample communication protocol, and further indicating tag responses and actions in connection with reader commands.

FIG. 8 illustrates a state machine diagram 800 according to a specific communication protocol, namely the Gen 2 Spec, which is here used as an example. This diagram also appears in the official text of the Gen2 Specification. Diagram 800 can be implemented by processing block 444 of the circuit of a tag compliant with the Gen2 Spec. It will be observed from diagram 800 what the tag circuit states can be, and what are the indicating tag responses and actions in connection with received reader commands. In some of these states the tag can be considered to have a singulated status (where it alone can be addressed, to the exclusion of the others), while in others it can be considered to have an unsingulated status (where the tag is lost to the reader within its population).

Figure 9:
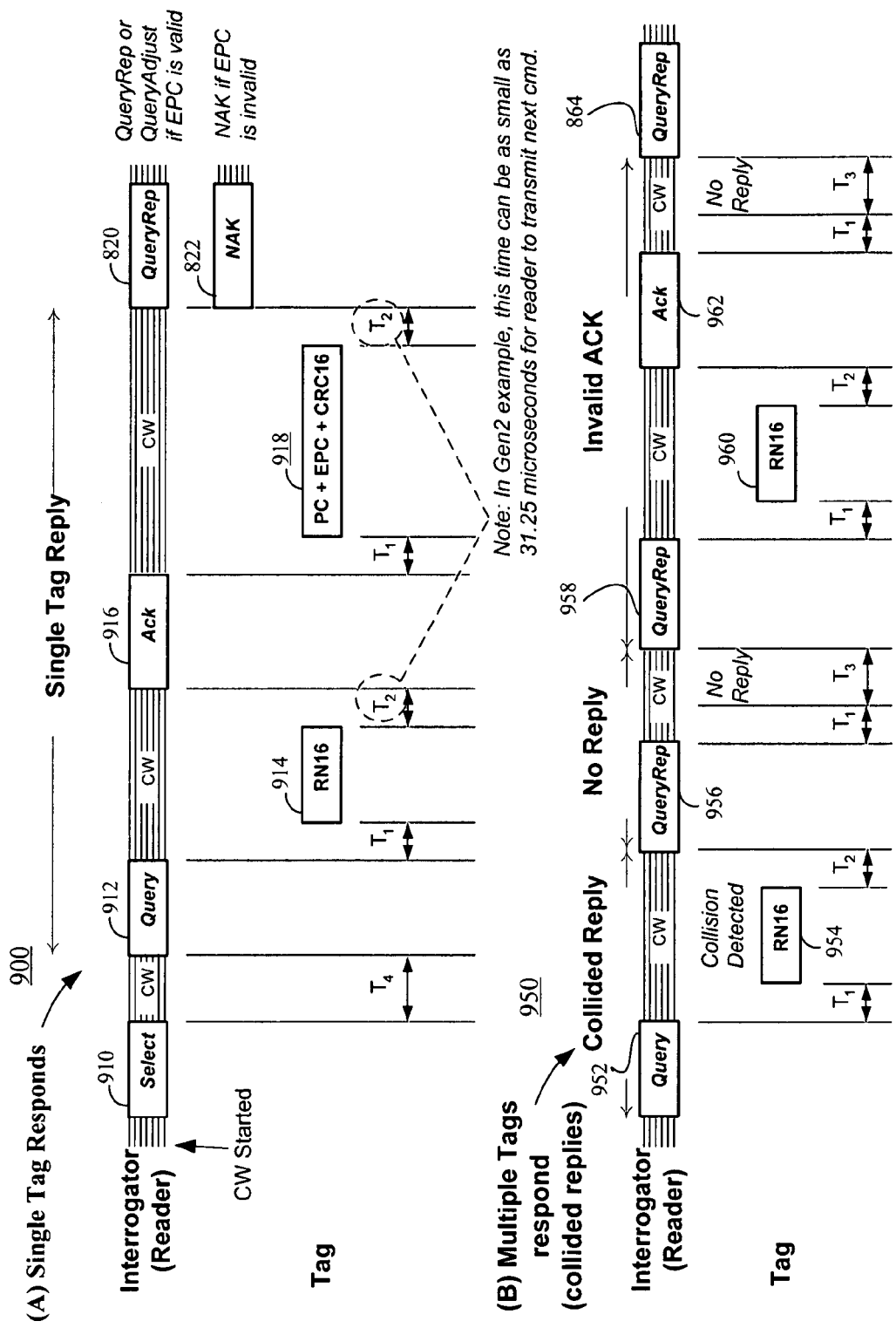
FIG. 9, is used for illustrating link timing examples, of the type that might occur when a reader inventories a population of tags by presenting slots, and one or more tags reply per slot.

FIG. 9, with parts (A) and (B), illustrates examples of the timing requirements and air-interface protocol used for reader-tag transactions involving a single tag and a population of multiple tags, respectively. The purpose is to provide examples of reader-tag transactions, and to illustrate how the timing requirements imposed by the air-interface protocol (in this example, the Gen2 protocol of FIG. 8) impact the transaction. In these examples, the Gen2 Spec defines a parameter "T2" that specifies the permitted time delay between a tag response and a subsequent reader transmission, before a default transition happens between states. For example, depending on the tag's current state, a failure by the reader to transmit a command within the T2 timeout period following a tag backscatter transmission would result in the tag transitioning to the Arbitrate state of FIG. 8, where the tag is lost again within its population.

Link timing examples are now described. They are the type that might occur when a reader inventories a population of tags by presenting slots, and one or more tags reply per slot.

Part (A) of FIG. 9 depicts a first link timing example, which is generally denoted with reference numeral 900. This example represents a single tag transaction, such as might occur when a single tag replies in a slot. As shown, shortly after the interrogator, or reader, starts its continuous wave (CW) transmission, the reader transmits a Select command 910, and following a time period denoted T4 the reader transmits a Query command 912. Within the time period denoted T1 the tag transmits or backscatters an RN16 response 914.

Then, within the T2 timeout period, the reader is required to make another transmission. In this example, the reader transmits an Acknowledge (ACK) command 916.

As noted, in the Gen2 protocol, time delay T2 can be as small as 31.25 microseconds, at fast enough data rates. This time period in which the reader is required to transmit a next command to prevent timeout of the tag could become even smaller in future versions of the Gen2 Spec, or in new industry standards or de facto standards that may be adopted.

The tag then responds to the ACK command 916 by backscattering its PC, EPC and CRC16, which are generally denoted with reference numeral 918. The reader then transmits, within the time period T2, a QueryRep or QueryAdj command 920, if the EPC is valid, or a NAK 922, if the EPC is invalid.

In part (B) of FIG. 9, reference numeral 950 generally refers to a linked timing example in which multiple tags reply in a slot. In this case, the replies are said to be collided. In this example, the reader issues a Query command 952 and multiple tags reply with their respective RN16 responses 954. In this case, a collision is detected and so the reader issues a QueryRep command 956. When no reply is detected within the time periods denoted by T1+T3, the reader issues a second QueryRep command 958. Following this, a single tag response is detected, in this case an RN16 response 960. Then, within the time period denoted T2, the reader transmits an ACK command 962, and then another QueryRep command 964. The second QueryRep command 964 is transmitted by the reader since no reply was received within the time period T1+T3. In the Gen2 Spec, T1 is defined as the time from interrogator/reader transmission to a tag response, and T3 is defined as the time an interrogator/reader waits, after T1, before it issues another command.

Figure 10:
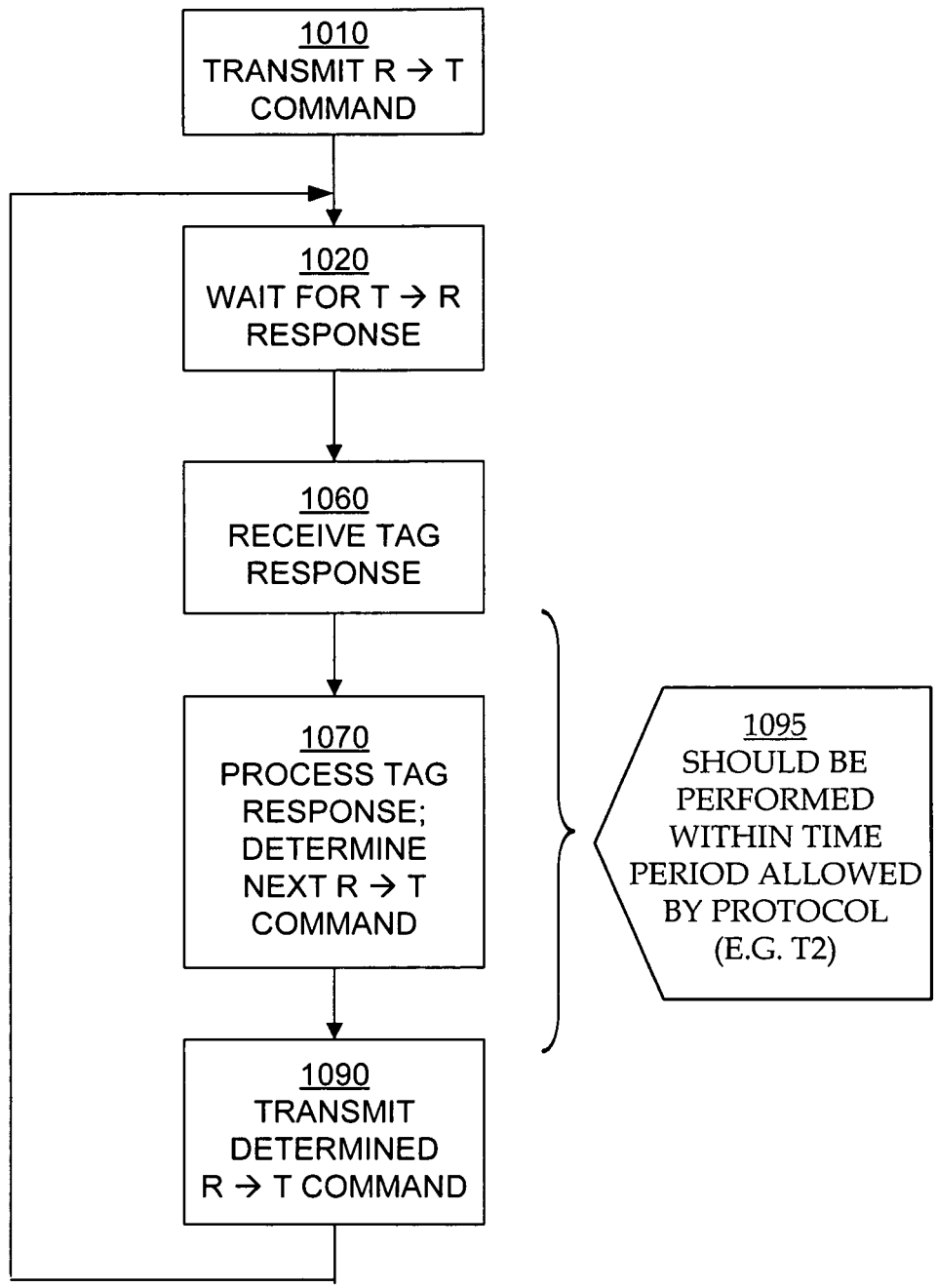
FIG. 10 is a flowchart illustrating a method in the prior art for generating R→T commands serially.

FIG. 10 shows a flowchart 1000 for describing a method in the prior art.

According to an operation 1010, the reader transmits a reader-to-tag, or R→T, command.

According to a next operation 1020, the reader waits for a tag response.

According to a next operation 1060 the reader receives the tag response.

According to a next operation 1070, the reader processes the tag response received at operation 1060. Processing is for generating a next reader command that is appropriate according to the protocol in use for the received tag response.

According to a next operation 1090, the reader transmits the next reader command generated by the processing of operation 1070. Execution then returns to operation 1020.

The challenge of the prior art is illustrated by comment 1095. The processing of operation 1070 has to be performed within the time period specified by the applicable air-interface protocol. For example, in a Gen2 environment, this time period is T2, which is measured from the end of the tag response (and substantially concurrent receipt of it by the reader), to the start of the next reader command being transmitted. As noted above, T2 can be as small as 31.25 microseconds. It will be appreciated that, in terms of how long various operations take, operation 1070 is by far the most time consuming one.

Methods are now described more particularly according to embodiments. In the below, the order of operations is not constrained to what is shown, and different orders may be possible. In addition, actions within each operation can be modified, deleted, or new ones added without departing from the scope and spirit of the invention.

Figure 11:
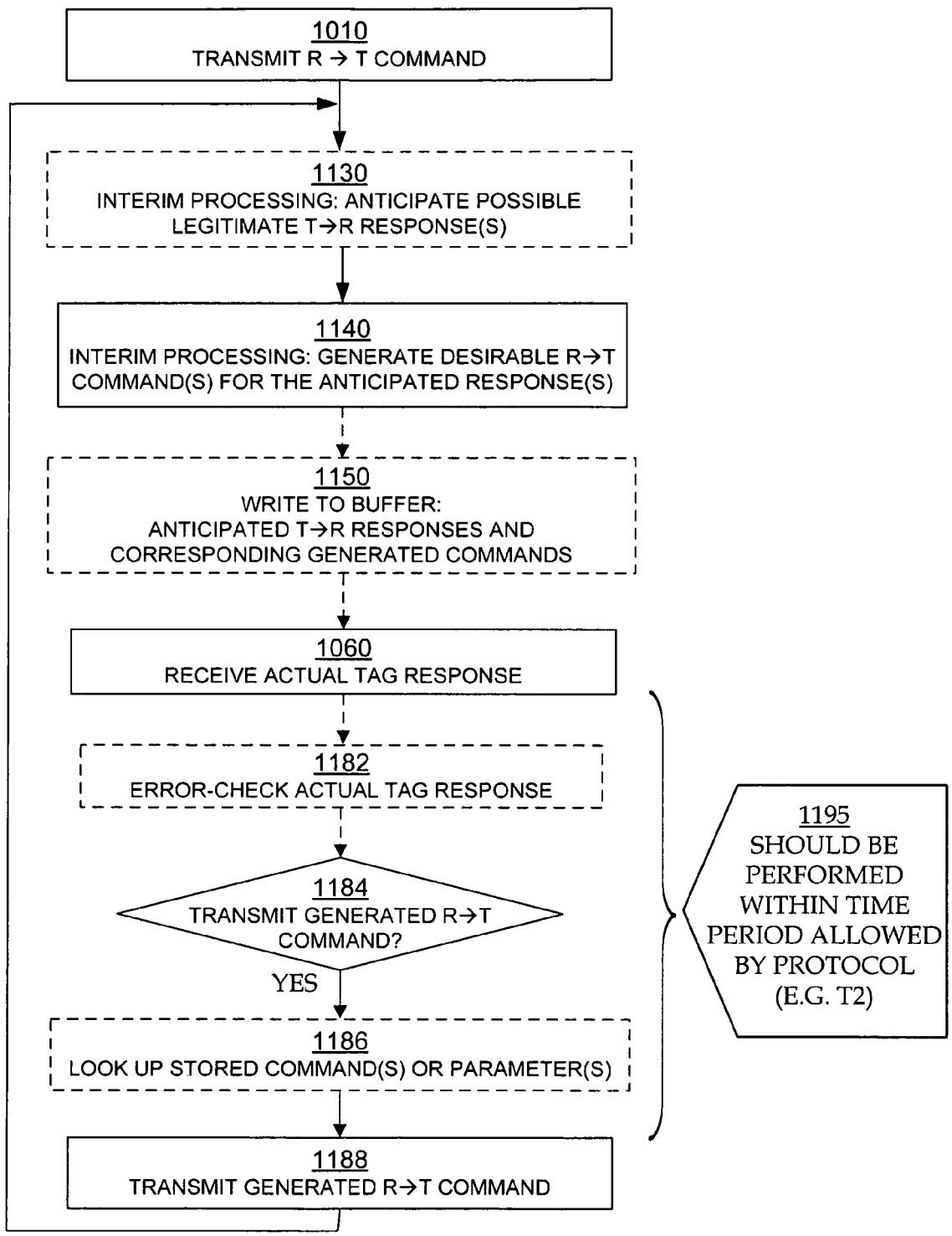
FIG. 11 is a flowchart illustrating a method for a reader system to generate reader commands.

FIG. 11 shows a flowchart 1100 for describing a method. The method of flowchart 100 may also be practiced by reader systems, such as systems 600, 700, etc. Flowchart 1100 includes operation 1010 described above. Namely, a first reader command is transmitted according to a protocol.

In addition, a first tag response to the first reader command can be anticipated according to the protocol. This anticipating can be programmed in, or executed as an operation. The first anticipated tag response can be any such response, such as a RN16, a tag code, a collision of responses from multiple tags, or even no response at all. The first anticipated tag response can further depend on different possible scenarios. For example, in the face of interference, it can be a response that is not recognized.

In some embodiments a reader system performs a process for inventorying a group of tags, such as by using a slotted aloha process. In these, the transmitted first reader command can be part of this inventorying process, and the generated second reader command can continue the inventorying process. Depending on the tag responses, actual and anticipated, the inventorying process can be continued as is, or the generated second reader command can adjust one of its parameters. Examples of a description of such an inventorying process can be seen in U.S. patent application Ser. No. 11/210,384, published as US 2005/0280505A1, the disclosure of which is hereby incorporated by reference.

For specific implementations of the Gen 2 Spec, an inventorying process can be set up with the reader system transmitting a Query command. One of the first anticipated tag responses is a Random Number, and the generated second reader command includes an Acknowledge command.

When the inventorying process is going, the first reader command can be a QueryRep command, for examining the contents of a next slot. The first anticipated tag response can be a Null response, in which case the generated second reader command can be another QueryRep command. Or the first anticipated tag response can be a collision, in which the generated second reader command can be a QueryAdj command for adjusting a Q parameter. In addition, a new Q parameter can be computed and communicated with this generated second reader command. A particular example will be described with reference to FIG. 12.

In flowchart 1100, according to an optional next operation 1130, the anticipated first tag response is determined. In fact, one or more of such responses can be determined. These can be determined in any number of ways, as will be evident to a person skilled in the art. One such way is by looking up stored tag responses that are legitimate according to the protocol for the first reader command. They can be stored in a storage medium such as a memory, buffer, etc., either by themselves or upon having decided on which is the first reader command.

According to a next operation 1140, a second reader command is generated. In fact, one or more such second reader commands are generated, which are desirable and legitimate according to the protocol in use for responding to the first anticipated tag response.

Importantly, computation for generating the second reader command commences before completely receiving a first tag response, as is later described for operation 1060 of flowchart 1100. Considering the intended use of the second reader command, this computation is really a precomputation, because the first tag response is not yet known. In some embodiments, this precomputation commences before even transmitting even the first reader command at operation 1010. In some embodiments, this whole precomputation is completed before that time.

Generating the second reader command can be performed in a number of ways. For example, it can include looking up stored reader commands that are legitimate according to the protocol for responding to the first anticipated tag response. Or it can assemble them, e.g. by checking individually their legitimacy and desirability. According to an optional next operation 1150, the one or more generated second reader commands are stored in a buffer. Along with the commands, the one or more first anticipated tag responses can also be stored, e.g. for indexing. Various implementations are possible.

In some embodiments, the second reader command is generated by processing at a first layer of the RFID reader system, and the buffer is in a second layer of the RFID reader system. For example, this buffer may be in the data link or physical layer of the reader, whereas the interim processing in this example is performed in the MAC layer. In other embodiments, the buffer is in a first layer of the RFID reader system, where the second reader command is generated. The second reader command can be transferred to a second layer of the RFID reader system for being transmitted.

According to next operation 1060, there is received an actual backscattered first tag response to the first reader command, in accordance with the protocol. This is performed as described above for flowchart 1000. A difference, however, is that by now some computation has already taken place.

According to an optional next operation 1182, the actual first tag response received at operation 1060 is error checked. This can be performed in any number of ways, such as is described, for example in co-pending U.S. patent application Ser. No. 11/388,235, filed 2006-Mar.-22, entitled "Error Recovery in RFID Reader Systems". The disclosure of that application is hereby incorporated by reference. A more robust reader system can thus result, especially in environments of high interference.

According to an optional operation 1184, it is determined whether the generated second reader command is to be transmitted. The determination takes place from the actual first tag response, received at operation 1060, and can take place in a number of ways. In some embodiments, the determination is made depending on whether the received actual first tag response corresponds to the first anticipated tag response. In some embodiments, the actual first tag response corresponds to the first anticipated tag response if they match. If it is determined to not transmit the generated second reader command, the process ends.

If at operation 1184 it is determined to transmit the generated second reader command, then according to an optional next operation 1186, one or more stored parameters can be looked up, for the generated second reader command whose transmission is impending. The parameter depends on the operation. A related example is described later in this document, with reference to FIG. 12 in an inventorying operation. The parameter can be stored in a memory buffer, such as described above.

According to a next operation 1188, the generated second reader command is transmitted responsive to the first tag response received at operation 1060. If operation 1184 has taken place, then the generated second reader command is transmitted only if it is so determined. Else another command can be transmitted, or no command can be transmitted.

Execution then can either stop there, or iterate, such as right after box 1010. This way these operations can be repeated for one or more second anticipated tag responses to the second reader command, which was transmitted at operation 1186. In addition, one or more third reader responses can be generated for the one or more second anticipated tag responses, and so on.

In these embodiments, more than one first tag responses can be anticipated, and for each such tag response, one or even more second reader commands can be generated. In fact, all possible tag responses can be anticipated this way, with second reader responses. Then the transmitted second reader command is the one of those whose anticipated first tag response corresponds to the actual received first tag response. In these embodiments, where multiple ones of these are determined, the desirable second reader command can be identified from its corresponding anticipated tag response. So, at operation 1188, the transmitted second reader command is the appropriate one for the actual first tag response.

According to a comment 1195, operations 1060, 1182, 1184, 1186, 1188 should be performed, in some embodiments, within a limited time. And as before, only operations 1182, 1184, 1186 require appreciable amounts of time. More time is available, however, because interim processing has already started at operation 1140, instead of waiting for the actual tag response at operation 1060. In fact, the time savings can be so much that additional operation 1182 of error checking can also be accommodated within this time.

The operations described herein may take place by appropriate design of components, and distribution of tasks among the components, as will be apparent to a person skilled in the art. For example, buffers can be implemented in the various modules of FIG. 7, which can store commands and communicate commands in an advantageous manner. In some embodiments, pre-computed commands can be stored in a buffer, and then transmitted. In some embodiments, they can be stored in the buffer of one component (e.g. the MAC layer), and transmitted to another (e.g. the Physical layer). For purposes of programming, commands can be given suitable names, and so on.

Figure 12:
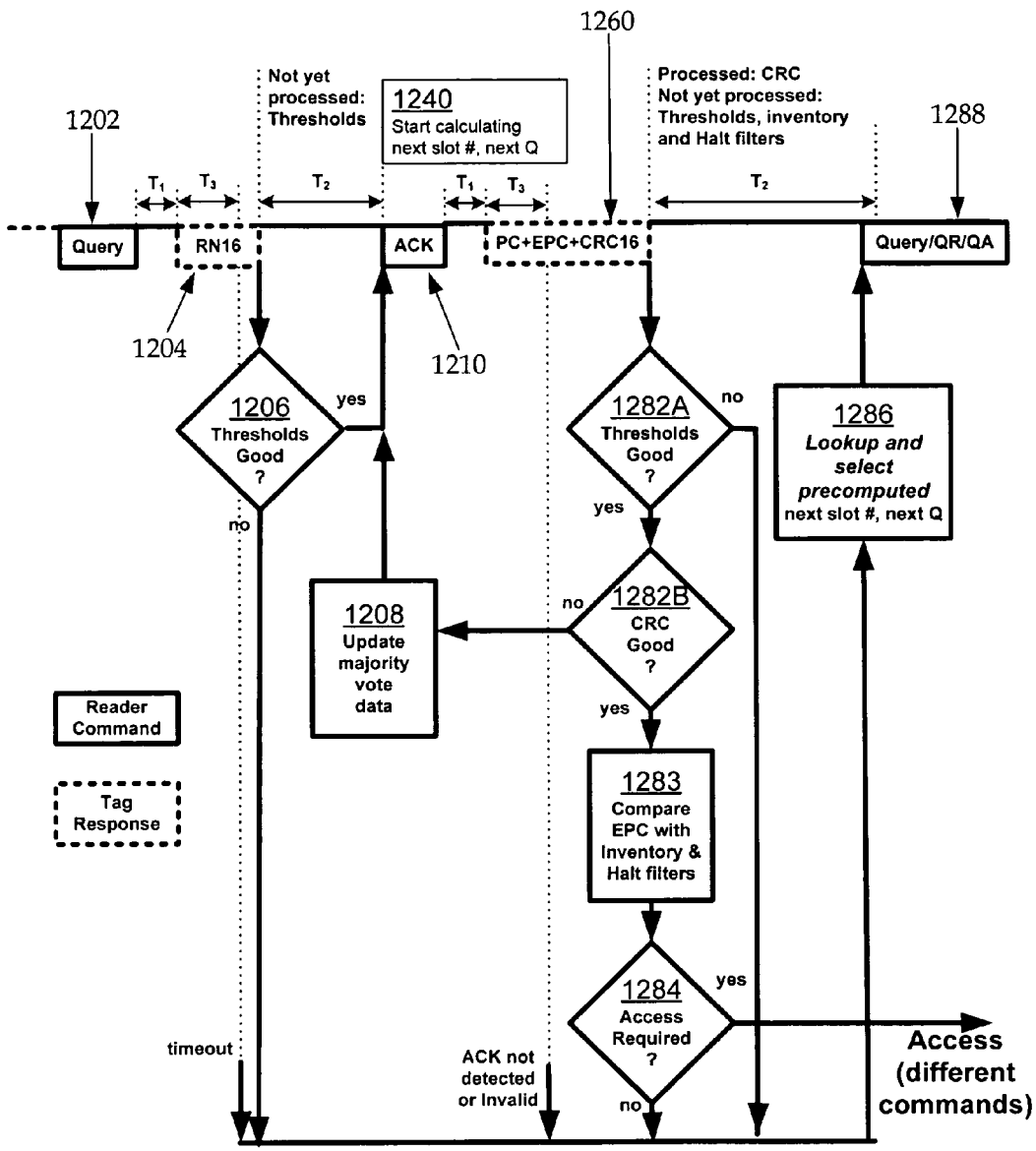
FIG. 12 is a diagram illustrating computations combined with exchanges over the air-interface according to embodiments.

FIG. 12 is a diagram 1200, for illustrating computations performed by a reader system, along with exchanges over the air-interface according to embodiments. In diagram 1200 the horizontal dimension is time, which is not to a continuous scale. Some events are depicted compressed while others expanded. In addition, some processing steps are shown on a vertical scale, as if not requiring any time at all. The reader commands are denoted by solid rectangular boxes and the tag responses are denoted by dash-line rectangular boxes.

The example of diagram 1200 can be one of an inventorying operation. After the reader system transmits a Query command 1202, it receives a tag response 1204 of an RN16. For this example, there was no collision, and the tag responded immediately, without needing any QueryRep commands from the initial Query command 1202.

At an operation 1206, tag response 1204 is error checked. In this instance, error checking involves checking thresholds of tag response 1204, and in particular checking whether its waveform segments are high and low by appropriate margins. If they are, then an Acknowledge command 1210 can be transmitted.

According to an operation 1240, a calculation can start taking place, for when it is needed next. It can be anticipated that the tag will respond to Acknowledge command 1210 with an EPC (Electronic Product Code) that will pass some criteria, and therefore inventorying will continue without accessing the tag. Operation 1240 can determine whether the next inventorying command will be a Query, QueryRep, or QueryAdj. For example, if the Q only is to change, then a QueryAdj may be called for. (Note that "Q" is the slot-count parameter as defined in the Gen2 Specification.)

It should be noted that operation 1240 starts taking place before a response is actually received to Acknowledge command 1210. In fact, it can start taking place before Acknowledge command 1210 is even transmitted. Although not shown, computed results are preferably stored.

Then a tag response 1260 is received, which includes the anticipated EPC.

Then at an operation 1282A, tag response 1260 is error checked. In this instance, error checking again involves checking thresholds of tag response 1260. Then at an operation 1282B, tag response 1260 is error checked for whether the CRC checks out with the EPC. Then at an operation 1283 an additional internal check is made.

Then at operation 1284, a determination is made as to whether to use the commands computed at operation 1240. The determination is made based on the received tag response 1260, and in this case it is more particularly as to whether the tag is to be accessed, or inventorying will proceed with another tag. In this case, inventorying is to proceed with another tag.

Then at operation 1286, a stored parameter is looked up, such as a next slot number, a Q value, whether new or not, and so on. Then the generated command 1288 is transmitted, which can be another Query, or a QueryRep, or a QueryAdj command.

It will be appreciated that at various portions of diagram 1200 there are time limits for responding. These time limits are T1 and T3 relative to tag response 1204, and T2 relative to tag responses 1204 and 1260. The precomputing at operation 1240 enabled responding with second generated command 1288 within time T2 from first actual received tag response 1260, even at high data rates.

Figure 13:
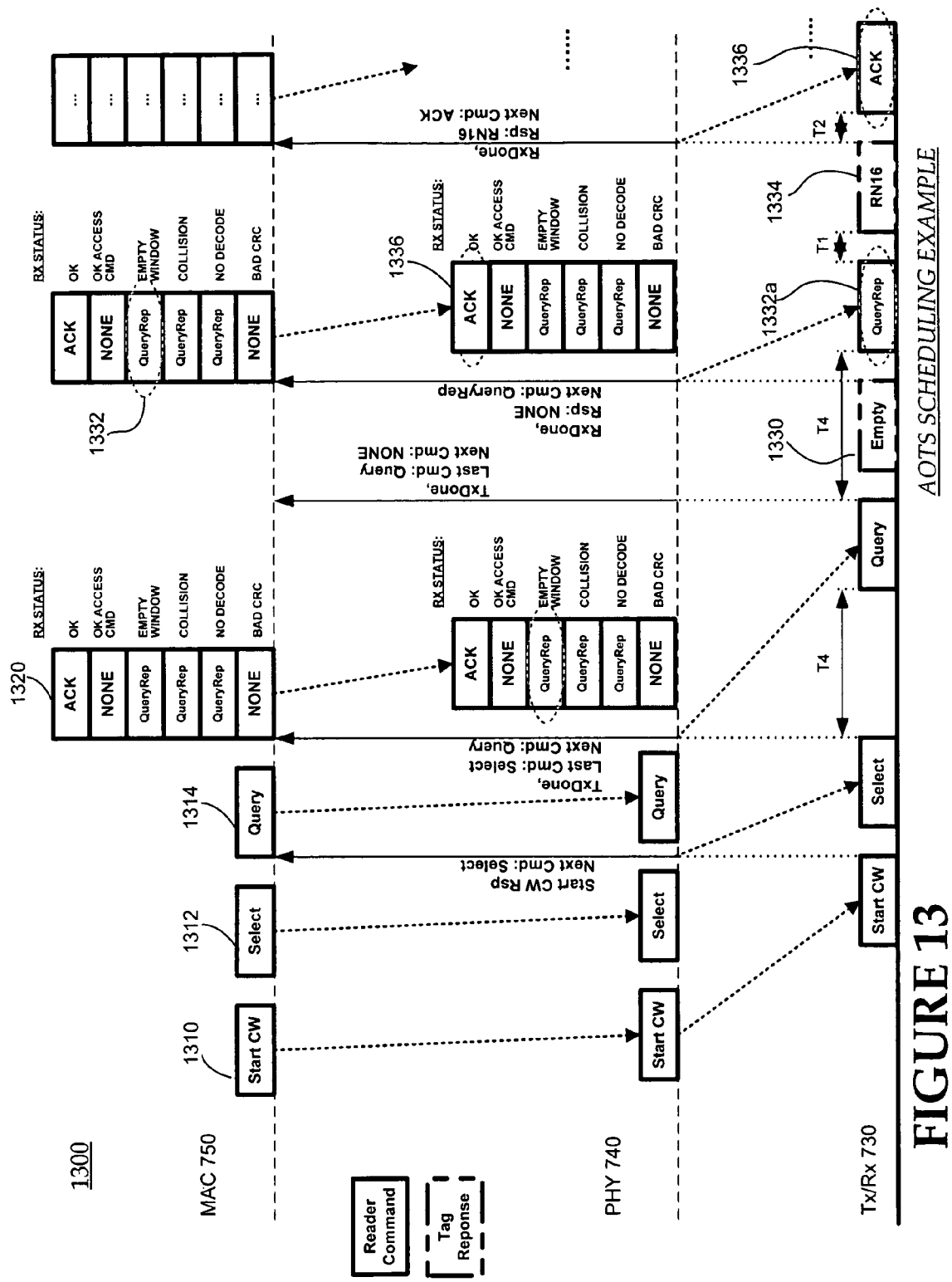
FIG. 13 is a diagram depicting precomputing reader system commands according to an embodiment.

FIG. 13 is a diagram 1300 for illustrating ahead-of-time scheduling from another perspective, and including other aspects of an example embodiment. As with FIG. 12, the time axis is horizontal, and not to scale. In addition, reader commands are represented by solid rectangular boxes, while tag responses are represented by dash-line boxes. Moreover, diagram 1300 illustrates three layers, including a Transmit/Receive layer, or signal processing layer, 730, a Physical layer 740, and a MAC layer 750.

The overall signal flow begins when the reader, in MAC layer 750, starts a CW transmission 1310. This is propagated from MAC layer 750 to Physical layer 740, and then to Transmit/Receive layer 730. MAC layer 750 then generates a Select command 1312, and this is propagated to Physical layer 740, and so on, as shown. MAC layer 750 then generates a Query command 1314, and propagates this to Physical layer 740.

During this interval, Select command 1312 has been propagated to Transmit/Receive layer 730, as shown. At this point, MAC layer 750 knows that its last command was Select command 1312 and its next command, which has yet to be propagated to the Transmit/Receive layer 730, is Query command 1314. Thus, MAC layer 750 begins to schedule its next command. This is represented by reference numeral 1320, which points to a table or buffer in which a group of reader-to-tag commands are shown, including ACK, two instances of NONE, and three instances of QueryRep. For example, if the receiver status is OK, then a suitable next command would be the ACK command. This table/buffer 1320 is propagated to Physical layer 740 within the time period denoted by T4 in FIG. 13. As mentioned, T4 represents the minimum time period separating successive R→T commands.

Following this time period T4, Query command 1314 is propagated from Physical layer 740 to Transmit/Receive layer 730, as shown. Once the reader system, also called a reader for short, completes the transmission of Query command 1314, the signal flow moves back to MAC layer 750 as shown.

During the next T4 time interval, the reader detects an empty window, denoted by reference numeral 1330, and therefore MAC layer 750 determines that the appropriate next command is the QueryRep command corresponding to the "empty window" receiver status. This is represented by reference numeral 1332. This QueryRep command is constructed in memory structure 1320 and is made accessible to, or placed in, Physical layer 740. Reference numeral 1332a denotes this QueryRep command being propagated to the Transmit/Receive layer 730.

Subsequently, the tag transmits an RN16 response 1334, which is first received in Transmit/Receive layer 730, and this is propagated back to MAC layer 750, which uses this to begin construction of the next command, which in this case would be ACK command 1336.

Figure 14:
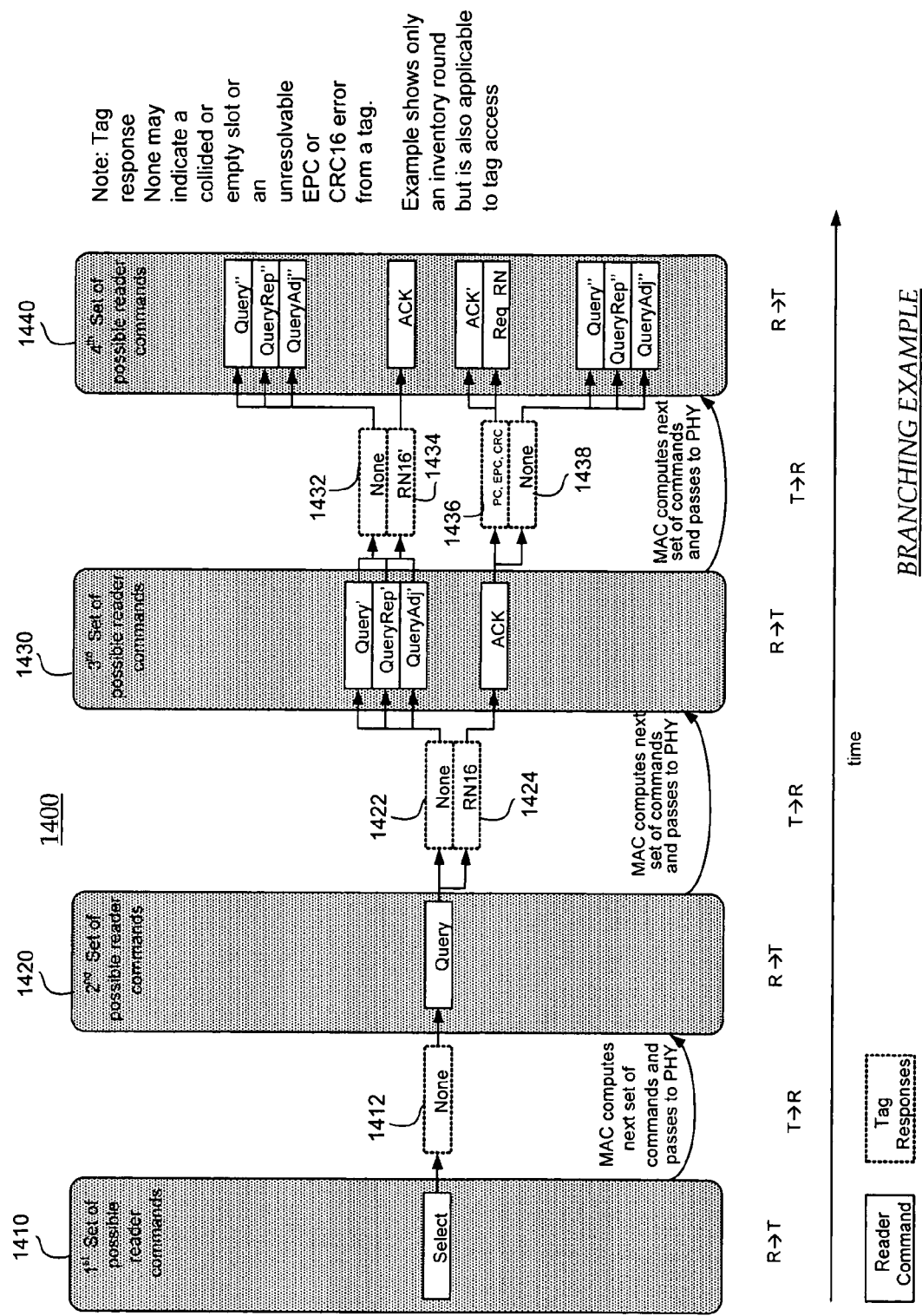
FIG. 14 is a diagram depicting precomputing reader system commands according to another embodiment.

FIG. 14 is another diagram 1400, for illustrating embodiments of ahead-of-time scheduling. Diagram 1400 further illustrates how future commands can be anticipated by the reader and pre-computed or scheduled ahead of time. While this example shows only a portion of an inventory round, it is also applicable to other operations, such as a tag access transaction.

Reference numeral 1410 denotes a first set of possible reader commands, in this case comprising only a Select command. The anticipated response to the Select command is designated with reference numeral 1412. In this case, the Null, or no response, is appropriate to the Select command.

Reference numeral 1420 denotes the second set of possible R→T commands. In this case, only the Query command would be appropriate to the Null T→R response 1412.

As shown, the two possible R→T responses to the Query command include the Null response 1422 and an RN16 response 1424. As also shown before, the MAC layer may pre-compute the next reader command(s) and pass these from the MAC layer to the Physical layer.

Moreover, reference numeral 1430 shows a third set of possible reader commands, including a second set of Query, QueryRep and QueryAdj commands, denoted Query', QueryRep' and QueryAdjust', respectively, as well as an Acknowledge (ACK) command.

Each of these possible reader commands can be further mapped to an anticipated T→R response. As shown, these include the Null (None) response 1432, an RN16' response 1434, and a response 1436 including a PC, EPC, and CRC, and another Null (None) response 1538.

These possible T→R responses can similarly be mapped to a fourth set of possible reader commands, denoted generally by reference numeral 1440. Again, these pre-computed reader commands can be initially formulated by the MAC layer and propagated to the Physical layer.

As noted in the FIG. 14, a Null T→R response may indicate a collided response or an empty slot or an unresolvable EPC or CRC16 error from the tag.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and subcombinations of elements, features, steps, and/or functions, which are regarded as novel and non-obvious.

Additional claims for other combinations and subcombinations may be presented in this or a related document. These claims apply to systems, software and methods, etc. above and beyond those merely compliant with the Gen2 Spec, except where specifically written so.

What is claimed is:

1. An operational processing block for an RFID reader, the RFID reader further including a buffer, the RFID reader used to communicate with at least one RFID tag according to a communication protocol, the operational processing block causing the RFID reader to cooperate with the at least one RFID tag to reduce latency within the reader-tag transaction, the operational processing block configured to:
   transmit a first reader command;
   receive a tag response responsive to the first reader command;
   calculate a second reader command responsive to the tag response;
   transmit the second reader command;
   store the second reader command in the reader's buffer;
   receive a tag response responsive to the second reader command;
   calculate a third reader command responsive to the tag response;
   store the third reader command in reader's buffer;
   transmit the third reader command;
   receive a tag response;
   if the received tag response corresponds to the second reader command, transmit the second reader command originating from the reader's buffer; or
   if the received tag response corresponds to the third reader command, transmit the third reader command originating from the reader's buffer; or
   if the received tag response does not correspond to any reader command held in the reader's buffer, calculate a reader command responsive to the tag response;
   transmit the reader command responsive to the tag response; and
   store the corresponding reader command in the reader's buffer.

2. The operational processing block of claim 1, wherein the anticipated tag responses are defined by the communication protocol.

3. The operational processing block of claim 1, wherein the received tag response invalid if one or more of:
   an error check indicates that there is an error in the received tag response,
   the received tag response is not recognized due to interference, and
   the received tag response is not recognized due to collision.

4. The operational processing block of claim 1, wherein at least one of the anticipated responses is an invalid response.

5. The operational processing block of claim 1, wherein the first reader command is part of a process for inventorying a group of tags, and the second reader command continues the inventorying process.

6. The operational processing block of claim 1, wherein
   the communication protocol is the Gen2 Specification,
   the first reader command comprises one from a set of: a Query, a QueryAdj, a QueryRep, and an Acknowledge command, and the second reader command includes one from a set of: a Query, a QueryAdj, a QueryRep, a Req_RN, a NAK, and an Acknowledge command.

7. The operational processing block of claim 1, wherein generating at least one of the second and third reader commands commences before completing transmitting the first reader command.

8. The operational processing block of claim 1, wherein the buffer is volatile.

9. A radio frequency identification (RFID) reader, the reader including a buffer, the RFID reader comprising: at least one antenna for exchanging wireless waves with at least one RFID tag according to a communication protocol; and a processing block operable to:
  transmit a first reader command;
  receive a tag response responsive to the first reader command;
  calculate a second reader command responsive to the tag response;
  transmit the second reader command;
  store the second reader command in the reader's buffer;
  receive a tag response responsive to the second reader command;
  calculate a third reader command responsive to the tag response;
  store the third reader command in reader's buffer;
  transmit the third reader command;
  receive a tag response;
  if the received tag response corresponds to the second reader command, transmit the second reader command originating from the reader's buffer; or
  if the received tag response corresponds to the third reader command, transmit the third reader command originating from the reader's buffer; or
  if the received tag response does not correspond to any reader command held in the reader's buffer, calculate a reader command responsive to the tag response;
  transmit the reader command responsive to the tag response; and
  store the corresponding reader command in the reader's buffer.

10. The RFID reader of claim 9, wherein the anticipated tag responses are defined by the communication protocol.

11. The RFID reader of claim 9, wherein the received tag response invalid if one or more of:
  an error check indicates that there is an error in the received tag response,
  the received tag response is not recognized due to interference, and
  the received tag response is not recognized due to collision.

12. The RFID reader of claim 9, wherein at least one of the anticipated responses is an invalid response.

13. The RFID reader of claim 9, wherein the first reader command is part of a process for inventorying a group of tags, and the second reader command continues the inventorying process.

14. The RFID reader of claim 9, wherein
  the communication protocol is the Gen2 Specification,
  the first reader command comprises one from a set of: a Query, a QueryAdj, a QueryRep, and an Acknowledge command, and
  the second reader command includes one from a set of: a Query, a QueryAdj, a QueryRep, a Req_RN, a NAK, and an Acknowledge command.

15. The RFID reader of claim 9, wherein generating at least one of the second and third reader commands commences before completing transmitting the first reader command.

16. The RFID reader of claim 9, wherein the buffer is volatile.

17. A method for use by a radio frequency identification (RFID) reader system including a reader buffer, the RFID reader system also having an antenna to communicate with at least one RFID tag according to a communication protocol, comprising:
  transmitting a first reader command;
  receiving a tag response responsive to the first reader command;
  calculating a second reader command responsive to the tag response;
  transmitting the second reader command; storing the second reader command in the reader's buffer;
  receiving a tag response responsive to the second reader command;
  calculating a third reader command responsive to the tag response;
  storing the third reader command in reader's buffer;
  transmitting the third reader command;
  receiving a tag response;
  transmitting the second reader command originating from the reader's buffer if the received tag response corresponds to the second reader command; or
  transmitting the third reader command originating from the reader's buffer if the received tag response corresponds to the third reader command; or
  calculating a reader command responsive to the tag response if the received tag response does not correspond to any reader command held in the reader's buffer;
  transmitting the reader command responsive to the tag response; and
  storing the corresponding reader command in the reader's buffer.

18. The method of claim 17, wherein the anticipated tag responses are defined by the communication protocol.

19. The method of claim 17, wherein the received tag response is invalid if one or more of:
  an error check indicates that there is an error in the received tag response,
  the received tag response is not recognized due to interference, and
  the received tag response is not recognized due to collision.

20. The method of claim 17, wherein at least one of the anticipated responses is an invalid response.

21. The method of claim 17, wherein the first reader command is part of a process for inventorying a group of tags, and the second reader command continues the inventorying process.

22. The method of claim 17, wherein
  the communication protocol is the Gen2 Specification,
  the first reader command comprises one from a set of: a Query, a QueryAdj, a QueryRep, and an Acknowledge command, and
  the second reader command includes one from a set of: a Query, a QueryAdj, a QueryRep, a Req_RN, a NAK, and an Acknowledge command.

23. The method of claim 17, wherein generating at least one of the second and third reader commands commences before completing transmitting the first reader command.

24. The method of claim 17, wherein the buffer is volatile.

* * * * *